(12) United States Patent
Broad et al.

(10) Patent No.: US 12,544,932 B2
(45) Date of Patent: Feb. 10, 2026

(54) METHODS AND APPARATUS FOR MODELING LOADING DOCK ENVIRONMENTS

(71) Applicant: Boston Dynamics, Inc., Waltham, MA (US)

(72) Inventors: Alex Broad, Somerville, MA (US); Karthik Ramachandran, Sunnyvale, CA (US); Yi Dong, Braintree, MA (US)

(73) Assignee: Boston Dynamics, Inc., Waltham, MA (US)

( * ) Notice: Subject to any disclaimer, the term of this patent is extended or adjusted under 35 U.S.C. 154(b) by 110 days.

(21) Appl. No.: 18/545,334

(22) Filed: Dec. 19, 2023

(65) Prior Publication Data

US 2024/0300110 A1    Sep. 12, 2024

Related U.S. Application Data

(60) Provisional application No. 63/451,143, filed on Mar. 9, 2023.

(51) Int. Cl.
| | | |
|---|---|---|
| *B25J 5/00* | (2006.01) | |
| *B25J 9/16* | (2006.01) | |
| *G06T 17/10* | (2006.01) | |
| *G06V 10/40* | (2022.01) | |
| *G06V 10/70* | (2022.01) | |
| *G06V 20/56* | (2022.01) | |

(52) U.S. Cl.
CPC ............... *B25J 9/1697* (2013.01); *B25J 5/00* (2013.01); *B25J 9/1666* (2013.01); *G06T 17/10* (2013.01); *G06V 10/40* (2022.01); *G06V 10/70* (2022.01); *G06V 20/56* (2022.01)

(58) Field of Classification Search
CPC .......... B25J 9/1666; B25J 9/1697; B25J 5/00; G06V 20/56; G06V 10/70; G06V 10/40; G06T 17/10

See application file for complete search history.

(56) References Cited

U.S. PATENT DOCUMENTS

| | | | | |
|---|---|---|---|---|
| 9,089,969 | B1 * | 7/2015 | Theobald | B25J 9/1687 |
| 9,457,970 | B1 * | 10/2016 | Zevenbergen | B25J 9/0093 |
| 9,463,574 | B2 * | 10/2016 | Purkayastha | B25J 9/1697 |
| 9,465,390 | B2 * | 10/2016 | Mason | G05D 1/0274 |
| 9,632,504 | B1 * | 4/2017 | Watts | G05D 1/024 |
| 9,682,481 | B2 * | 6/2017 | Lutz | B25J 5/007 |
| 9,827,683 | B1 * | 11/2017 | Hance | G06Q 10/063 |
| 9,880,561 | B2 * | 1/2018 | Russell | G05D 1/0297 |
| 9,886,035 | B1 * | 2/2018 | Watts | G05D 1/0088 |

(Continued)

OTHER PUBLICATIONS

Kartoun et al., Vision-Based Autonomous Robot Self-Docking and Recharging, 2006, IEEE, p. 1-8 (Year: 2006).*

(Continued)

*Primary Examiner* — McDieunel Marc
(74) *Attorney, Agent, or Firm* — Pierce Atwood LLP

(57) ABSTRACT

Methods and apparatus for operating a mobile robot in a loading dock environment are provided. The method comprises capturing, by a camera system of the mobile robot, at least one image of the loading dock environment, and processing, by at least one hardware processor of the mobile robot, the at least one image using a machine learning model trained to identify one or more features of the loading dock environment.

17 Claims, 14 Drawing Sheets

(56) References Cited

U.S. PATENT DOCUMENTS

| | | |
|---|---|---|
| 9,919,420 B1* | 3/2018 | Theobald ............... B25J 13/003 |
| 10,124,489 B2 | 11/2018 | Chitta et al. |
| 10,657,390 B2 | 5/2020 | Mei et al. |
| 10,936,861 B2 | 3/2021 | Zheng et al. |
| 2017/0357270 A1* | 12/2017 | Russell .................. G06V 20/10 |

OTHER PUBLICATIONS

Karlsson et al., Core technologies for service robotics, 2004, IEEE, p. 2979-2984 (Year: 2004).*

Min et al., Autonomous docking for an eROSI robot based on a vision system with points clustering, 2007, IEEE, p. 1-6 (Year: 2007).*

Schilling et al., Navigation and Docking Manoeuvres of Mobile Robots in Industrial Environments, 1998, IEEE, pg., (Year: 1998).*

* cited by examiner

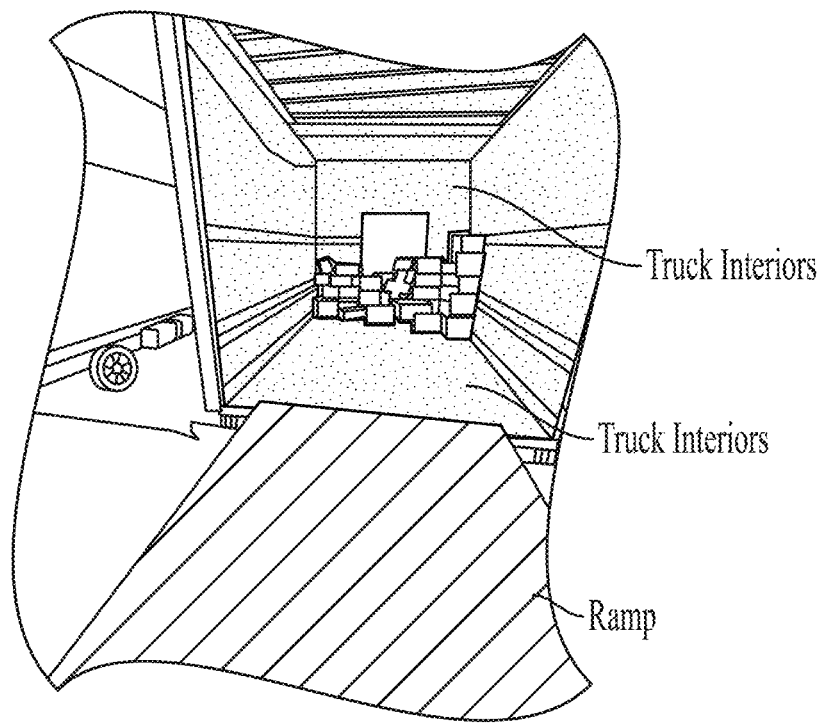
FIG. 10
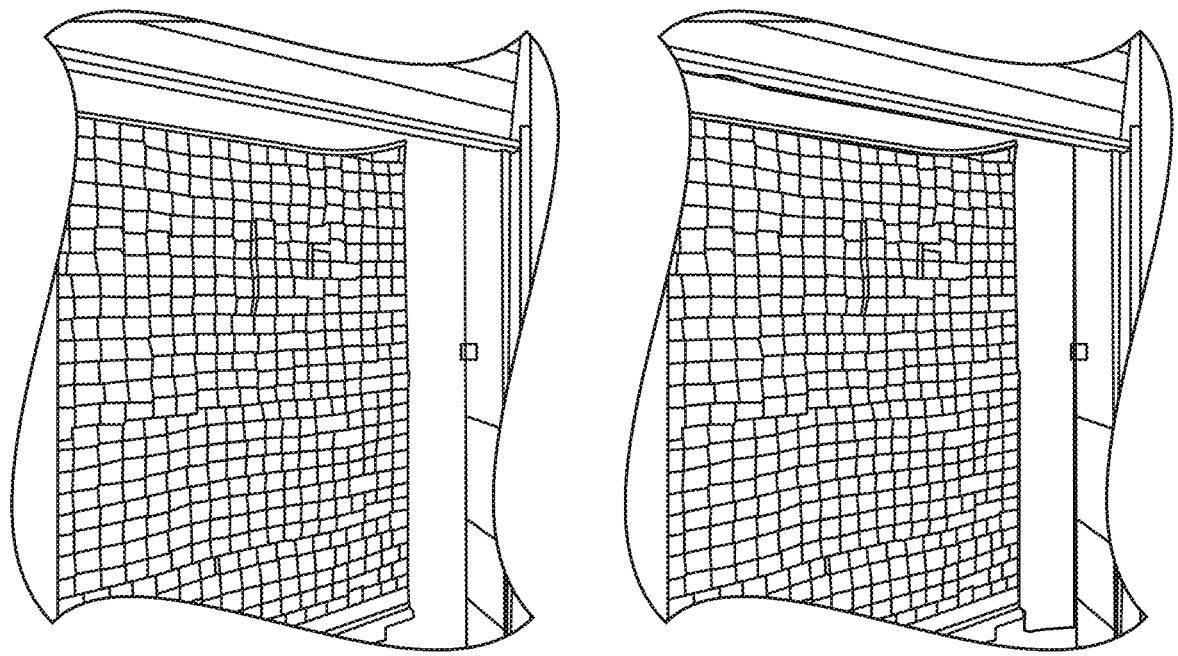
FIG. 11A
FIG. 11B

METHODS AND APPARATUS FOR MODELING LOADING DOCK ENVIRONMENTS

CROSS-REFERENCE TO RELATED APPLICATIONS

This application claims the benefit under 35 U.S.C. § 119(e) to U.S. Provisional Patent Application No. 63/451,143, filed on Mar. 9, 2023, and titled, "METHODS AND APPARATUS FOR MODELING LOADING DOCK ENVIRONMENTS," the entire contents of which is incorporated by reference herein.

FIELD OF INVENTION

This disclosure relates to techniques for using a robotic device to model aspects of a loading dock environment.

BACKGROUND

A robot is generally defined as a reprogrammable and multifunctional manipulator designed to move material, parts, tools, and/or specialized devices (e.g., via variable programmed motions) for performing tasks. Robots may include manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

A mobile robot operating in a loading dock environment may be tasked with unloading objects (e.g., boxes) from a container (e.g., a truck) located at a loading bay. To enable the mobile robot to effectively and safely unload objects from the container, the robot may use sensors located onboard the robot to perceive features of the loading dock environment. When operating inside of the container, the mobile robot may be configured to perceive information about the truck interior (e.g., walls, ceiling) using one or more distance sensors (e.g., LIDAR sensors, time-of-flight sensors, etc.) that measure the distance between the robot and the features of the truck interior.

The inventors have recognized and appreciated that it may be advantageous for the robot to obtain information about features of the loading dock environment when the robot is operating outside of the container (e.g., prior to the robot entering the container). For instance, such information may enable the robot to effectively and safely grasp boxes or other objects within the container while the base of the robot remains outside of the container. Such functionality may be particularly helpful if the container is tightly packed such that the robot cannot enter the container until some of the objects have been removed. Additionally, perceiving information about the loading dock environment may enable the robot to safely drive into the container when there is sufficient room in the container for the robot to do so. In some instances, the onboard distance sensors used to obtain information about the container interior when the robot is located inside the container may not be able to sufficiently capture information about the loading dock environment when the robot is located outside of the container. Additionally, when the robot is located inside the container and wants to drive toward the entrance of the container (e.g., to pick up a dropped object or to exit the container), the field of view of the onboard sensors may be obstructed (e.g., due to an attached conveyor), which may inhibit the ability of the robot to move in that direction. Information about the loading dock environment, including the location of the ramp leading into the truck, which is obtained prior to the robot entering the truck, may be used facilitate movement of the robot toward the entrance of the truck and/or out of the truck when its onboard sensors are obstructed. Some embodiments of the present disclosure relate to techniques for identifying one more features of a loading dock environment using a camera system of a mobile robot and a trained machine learning model to facilitate one or more operations of the mobile robot within the loading dock environment.

In some embodiments, the invention features a method of operating a mobile robot in a loading dock environment. The method includes capturing, by a camera system of the mobile robot, at least one image of the loading dock environment, and processing, by at least one hardware processor of the mobile robot, the at least one image using a machine learning model trained to identify one or more features of the loading dock environment.

In one aspect, the method further includes controlling an operation of the mobile robot based, at least in part, on an output of the machine learning model. In another aspect, the method further includes capturing, by the camera system, depth information associated with objects in the loading dock environment, and controlling an operation of the mobile robot is further based, at least in part, on the depth information. In another aspect, the output of the machine learning model includes at least one mask identifying the one or more features, and method further includes generating a three-dimensional (3D) representation of each of the one or more features of the loading dock environment based on the at least one mask and the depth information, and controlling the operation of the mobile robot is based, at least in part, on the 3D representation of at least one of the one or more features of the loading dock environment. In another aspect, generating the 3D representation of each of the one or more features of the loading dock environment includes projecting pixels in each of the at least one mask into the 3D representation using the depth information. In another aspect, generating the 3D representation of each of the one or more features of the loading dock environment further includes fitting one or more geometric primitives to the projected pixels to generate the 3D representation of each of the one or more features.

In one aspect, processing the at least one image using a machine learning model includes generating at least one mask identifying the one or more features in the at least one image. In another aspect, generating at least one mask identifying the one or more features in the at least one image includes generating a first mask identifying a first feature of the loading dock environment and generating a second mask identifying a second feature of the loading dock environment.

In one aspect, controlling an operation of the mobile robot based, at least in part, on an output of the machine learning model comprises controlling the mobile robot to drive in a particular direction. In another aspect, the one or more features of the loading dock environment include a ramp, and controlling the mobile robot to drive in a particular direction includes controlling the mobile robot to drive on the ramp.

In one aspect, controlling an operation of the mobile robot based, at least in part, on an output of the machine learning model includes planning an arm trajectory for the mobile robot, wherein the arm trajectory avoids contact of the mobile robot and/or an object grasped by the mobile robot with the one or more features of the loading dock environment. In another aspect, the one or more features of the loading dock environment include dock curtains, and planning an arm trajectory for the mobile robot includes planning the arm trajectory to avoid contact of the mobile robot and/or an object grasped by the mobile robot with the dock curtains. In another aspect, the one or more features of the loading dock environment include a truck interior, and planning an arm trajectory for the mobile robot includes planning the arm trajectory to avoid contact of the mobile robot and/or an object grasped by the mobile robot with the truck interior. In another aspect, controlling an operation of the mobile robot based, at least in part, on an output of the machine learning model further includes controlling the mobile robot to move an arm of the robot through the arm trajectory.

In one aspect, controlling an operation of the mobile robot based, at least in part, on an output of the machine learning model includes controlling the mobile robot to grasp an object inside of a truck in the loading dock environment while a base of the mobile robot is located outside of the truck. In another aspect, the at least one image comprises a color image. In another aspect, the color image is a red-green-blue (RGB) image. In another aspect, the one or more features of the loading dock environment include one or more of a ramp, dock curtains, or a truck interior. In another aspect, the one or more features of the loading dock environment include the ramp, the dock curtains and the truck interior.

In some embodiments, the invention features a mobile robot. The mobile robot includes a camera system and at least one hardware processor. The at least one hardware processor is programmed to control the camera system to capture at least one image of a loading dock environment, and process the at least one image using a machine learning model trained to identify one or more features of the loading dock environment.

In one aspect, the at least one hardware processor is further programmed to control an operation of the mobile robot based, at least in part, on an output of the machine learning model. In another aspect, the at least one hardware processor is further programmed to control the camera system to capture depth information associated with objects in the loading dock environment, and controlling an operation of the mobile robot is further based, at least in part, on the depth information. In another aspect, the output of the machine learning model includes at least one mask identifying the one or more features, and wherein the at least one hardware processor is further programmed to generate a three-dimensional (3D) representation of each of the one or more features of the loading dock environment based on the at least one mask and the depth information, wherein controlling the operation of the mobile robot is based, at least in part, on the 3D representation of at least one of the one or more features of the loading dock environment. In another aspect, generating the 3D representation of each of the one or more features of the loading dock environment includes projecting pixels in each of the at least one mask into the 3D representation using the depth information. In another aspect, generating the 3D representation of each of the one or more features of the loading dock environment further includes fitting one or more geometric primitives to the projected pixels to generate the 3D representation of each of the one or more features.

In one aspect, processing the at least one image using a machine learning model includes generating at least one mask identifying the one or more features in the at least one image. In another aspect, generating at least one mask identifying the one or more features in the at least one image includes generating a first mask identifying a first feature of the loading dock environment and generating a second mask identifying a second feature of the loading dock environment.

In one aspect, the mobile robot further includes a drive system, and controlling an operation of the mobile robot based, at least in part, on an output of the machine learning model includes controlling the drive system to drive the mobile robot in a particular direction. In another aspect, the one or more features of the loading dock environment include a ramp, and controlling the drive system to drive the mobile robot in a particular direction includes controlling the drive system to drive the mobile robot on the ramp.

In one aspect, the mobile robot further includes an arm having an end effector coupled thereto, and controlling an operation of the mobile robot based, at least in part, on an output of the machine learning model includes planning a trajectory of the arm to avoid contact of one or more of the arm, the end effector or an object grasped by the end effector with the one or more features of the loading dock environment. In another aspect, the one or more features of the loading dock environment include dock curtains, and planning a trajectory of the arm includes planning the trajectory to avoid contact of one or more of the arm, the end effector or an object grasped by the end effector with the dock curtains. In another aspect, the one or more features of the loading dock environment include a truck interior, and planning a trajectory of the arm includes planning the trajectory to avoid contact of one or more of the arm, the end effector or an object grasped by the end effector with the truck interior. In another aspect, controlling an operation of the mobile robot based, at least in part, on an output of the machine learning model further includes controlling the mobile robot to move the arm through the planned trajectory.

In one aspect, the mobile robot further includes a base and an arm coupled to the base, the arm having an end effector coupled thereto, and controlling an operation of the mobile robot based, at least in part, on an output of the machine learning model includes controlling the arm and/or the end effector to grasp an object inside of a truck in the loading dock environment while the base is located outside of the truck.

In one aspect, the at least one image comprises a color image. In another aspect, the color image is a red-green-blue (RGB) image. In another aspect, the one or more features of the loading dock environment include one or more of a ramp, dock curtains, or a truck interior. In another aspect, the one or more features of the loading dock environment include the ramp, the dock curtains and the truck interior.

In some embodiments, the invention features a method of training a machine learning model to detect one or more features of a loading dock environment. The method includes receiving a plurality of images of one or more loading dock environments, receiving an annotation for each of a plurality of features in each of the plurality of images, the annotation for each of the plurality of features being represented by one or more n-sided polygons, training, by at least one hardware processor, a machine learning model based, at least in part on the received annotations, and outputting the trained machine learning model.

In some embodiments, the invention features a method of operating a mobile robot in a loading dock environment including a truck. The method includes capturing at least one image of the loading dock environment, processing, by at least one hardware processor of the mobile robot, the at least one image of the loading dock environment with a trained machine learning model to determine information about a ramp in the loading dock environment, and driving the mobile robot from outside the truck over the ramp and into the truck based, at least in part, on the information about the ramp.

In some embodiments, the method features a method of operating a mobile robot in a loading dock environment including a truck. The method includes positioning a base of the mobile robot outside of the truck, capturing at least one image of the loading dock environment, processing, by at least one hardware processor of the mobile robot, the at least one image of the loading dock environment with a trained machine learning model to determine information about dock curtains and/or an interior of the truck, planning an arm trajectory of the mobile robot based, at least in part, on the information about the dock curtains and/or the interior of the truck to avoid contact with the dock curtains and/or the interior of the truck, and executing the arm trajectory to grasp an object inside the truck while the base of the mobile robot remains outside of the truck.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

FIG. 10 illustrates feature annotation overlays on an image of a loading dock environment that may be used to train a machine learning model, according to an illustrative embodiment of the invention.

FIG. 11A illustrates an image of a loading dock environment that includes dock curtains.

FIG. 11B illustrates an annotation overlay for the dock curtains shown in the image of FIG. 11A, according to an illustrative embodiment of the invention.

DETAILED DESCRIPTION

Figure 1A:
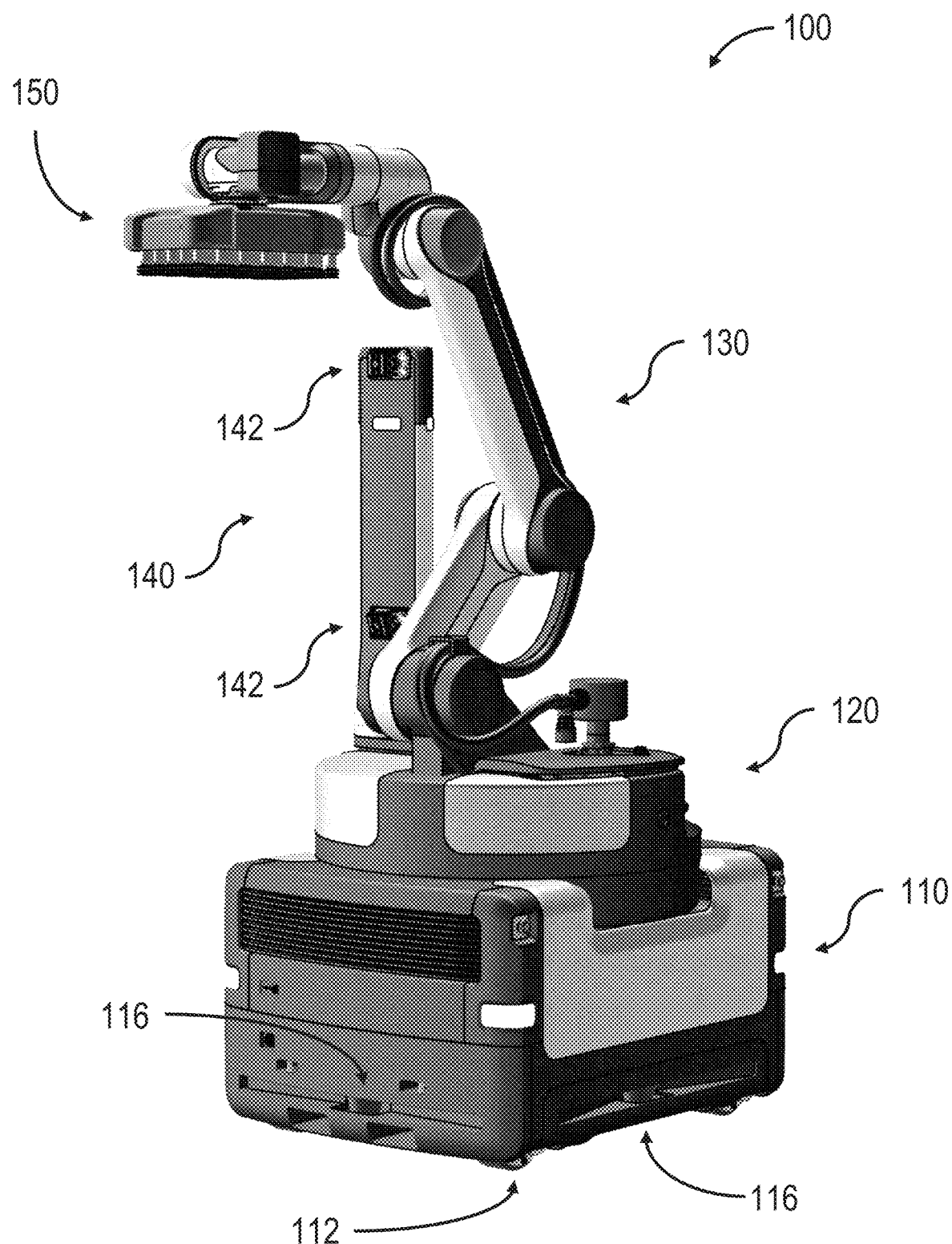
FIGS. 1A and 1B are perspective views of a robot, according to an illustrative embodiment of the invention.

Identification of features of a loading dock environment is important to ensure that a mobile robot operating in such an environment has sufficient situational awareness to operate safely. For example, loading dock environments may include ramps that extend from the floor to a height where the bed of a truck or other container is located when a truck is backed into a loading bay. Without knowledge of the position, orientation, and size of the ramp, the mobile robot may not be able to safely drive from outside the truck to inside the truck or vice versa. Additionally, without knowledge about the location and configuration of dock curtains/seals/shelters (collectively "dock curtains") within the loading bay, the mobile robot may not be able to safely operate (e.g., grasp boxes from within the truck) near the entrance of the truck from outside of the truck. For example, dock curtains may impose additional constraints on the workspace of the robot that, if not properly accounted for, may result in collisions that damage the robot, the dock curtains, and/or the objects being grasped. Due to these constraints, humans may be tasked with unloading enough boxes from the truck without support from the mobile robot, such that the robot can begin operating inside of the truck. Requiring the robot to begin operating only after entering the truck limits the utility of the robot to operate in the loading dock environment, and may inhibit the robot's ability to recover from failure when objects are dropped near the truck entrance. Additionally, starting operation of the mobile robot outside of the truck may be safer and more efficient than using operator entered values for features of the loading dock environment, and may be more effective than starting operation of the mobile robot inside of the truck.

Some embodiments of the present disclosure relate to techniques for identifying features of a loading dock environment that enable a mobile robot to safely operate both inside and outside of a truck or other container within a loading dock environment. As described in more detail below, identifying features (e.g., ramps, dock curtains, truck interior such as walls, floor and ceiling) of the loading dock environment may involve capturing one or more images of the loading dock environment and processing the image(s) with a machine learning model trained to identify the features of the loading dock environment. The identified features may then be projected into a three-dimensional representation, which may enable the mobile robot to operate safely in the environment by, for example, safely driving over the ramp and/or avoiding contact with features such as the dock curtains and truck interior, when grasping objects located inside of the container.

Robots can be configured to perform a number of tasks in an environment in which they are placed. Exemplary tasks may include interacting with objects and/or elements of the environment. Notably, robots are becoming popular in warehouse and logistics operations. Before robots were introduced to such spaces, many operations were performed manually. For example, a person might manually unload boxes from a truck onto one end of a conveyor belt, and a second person at the opposite end of the conveyor belt might organize those boxes onto a pallet. The pallet might then be picked up by a forklift operated by a third person, who might drive to a storage area of the warehouse and drop the pallet for a fourth person to remove the individual boxes from the pallet and place them on shelves in a storage area. Some robotic solutions have been developed to automate many of these functions. Such robots may either be specialist robots (i.e., designed to perform a single task or a small number of related tasks) or generalist robots (i.e., designed to perform a wide variety of tasks). To date, both specialist and generalist warehouse robots have been associated with significant limitations.

For example, because a specialist robot may be designed to perform a single task (e.g., unloading boxes from a truck onto a conveyor belt), while such specialized robots may be efficient at performing their designated task, they may be unable to perform other related tasks. As a result, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, while a generalist robot may be designed to perform a wide variety of tasks (e.g., unloading, palletizing, transporting, depalletizing, and/or storing), such generalist robots may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible.

Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task.

In such systems, the mobile base and the manipulator may be regarded as effectively two separate robots that have been joined together. Accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while certain limitations arise from an engineering perspective, additional limitations must be imposed to comply with safety regulations. For example, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not threaten the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, a highly integrated mobile manipulator robot with system-level mechanical design and holistic control strategies between the manipulator and the mobile base may provide certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
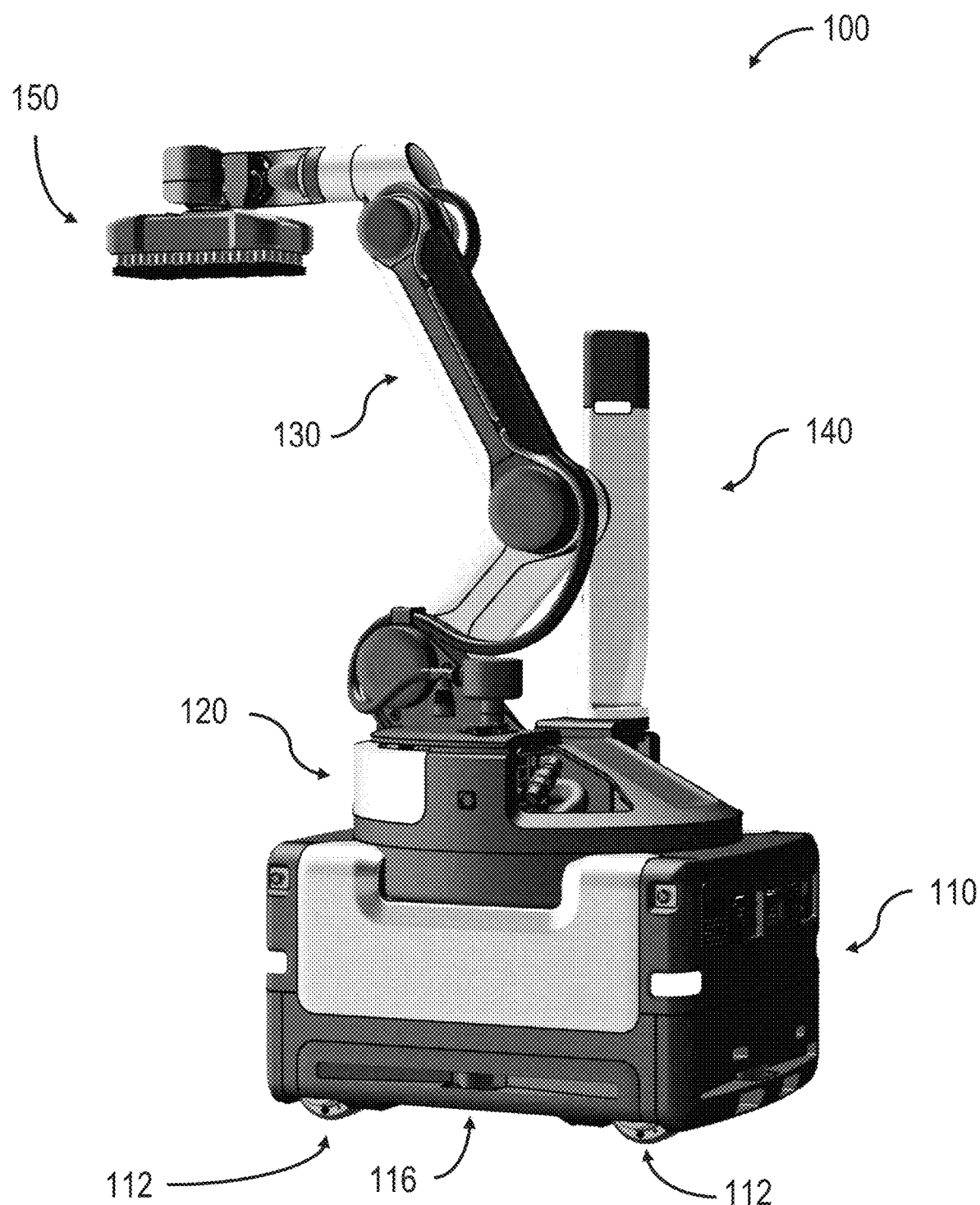

FIGS. 1A and 1B are perspective views of a robot 100, according to an illustrative embodiment of the invention. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
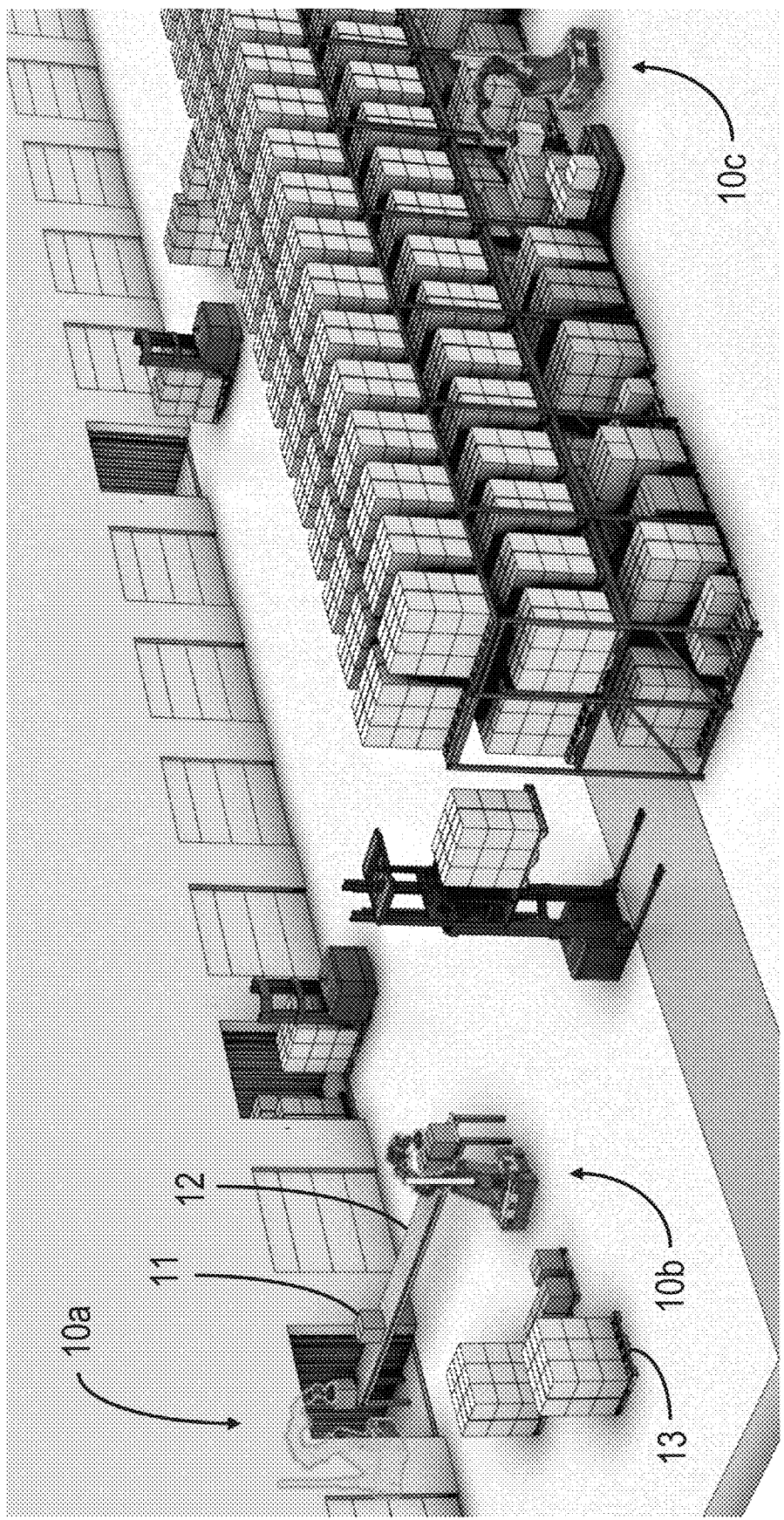
FIG. 2A depicts robots performing different tasks within a warehouse environment, according to an illustrative embodiment of the invention.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). The robots 10a, 10b, and 10c can be different instances of the same robot or similar robots. Accordingly, the robots described herein may be understood as specialized multi-purpose robots, in that they are designed to perform specific tasks accurately and efficiently, but are not limited to only one or a small number of tasks.

Figure 2B:
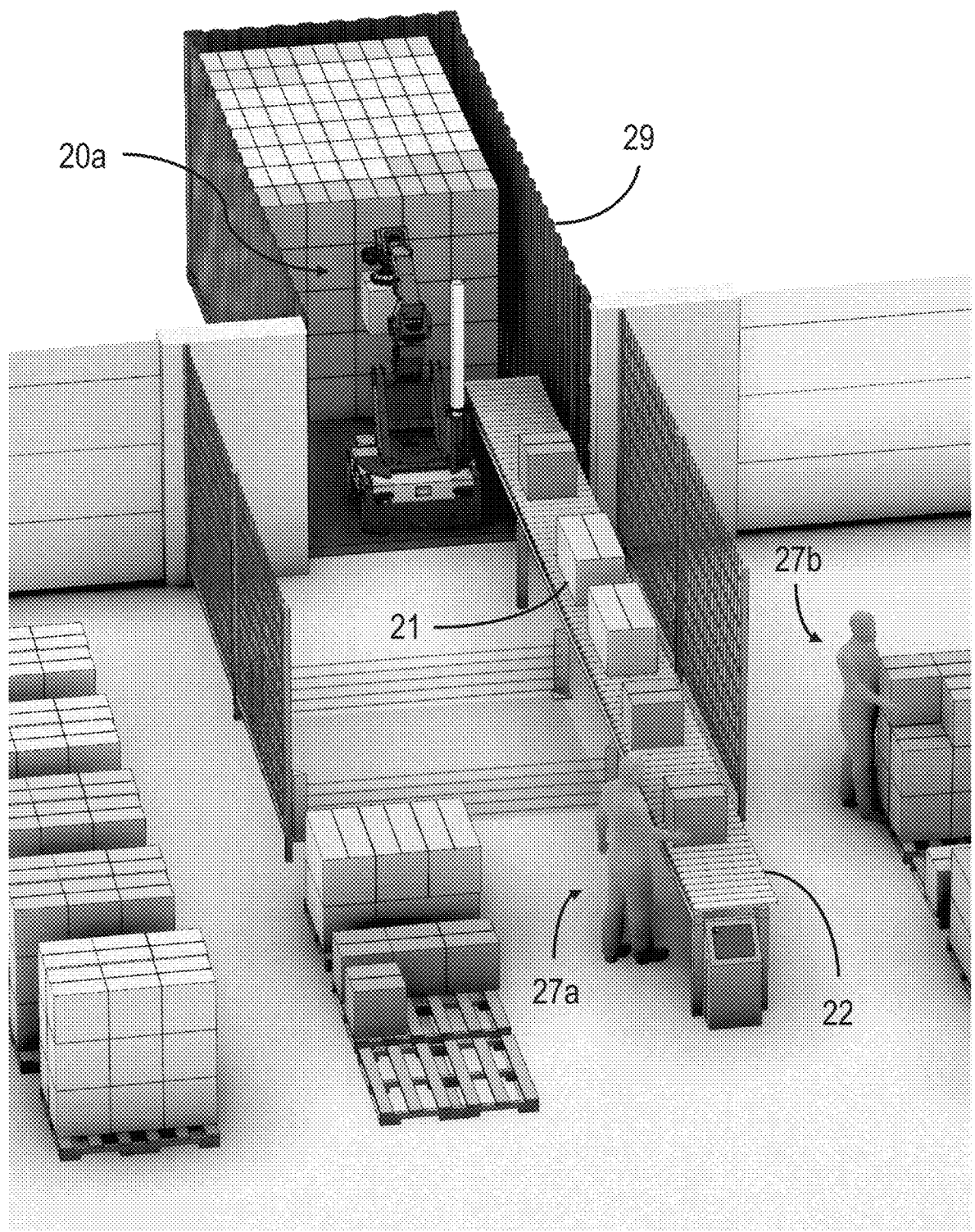
FIG. 2B depicts a robot unloading boxes from a truck and placing them on a conveyor belt, according to an illustrative embodiment of the invention.

FIG. 2B depicts a robot 20a unloading boxes 21 from a truck 29 and placing them on a conveyor belt 22. In this box picking application (as well as in other box picking applications), the robot 20a repetitiously picks a box, rotates, places the box, and rotates back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B.

During operation, the perception mast of robot 20a (analogous to the perception mast 140 of robot 100 of FIGS. 1A and 1B) may be configured to rotate independently of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety field around the robot (e.g., into which humans are prevented from entering and/or which are associated with other safety controls, as explained in greater detail below).

Figure 2C:
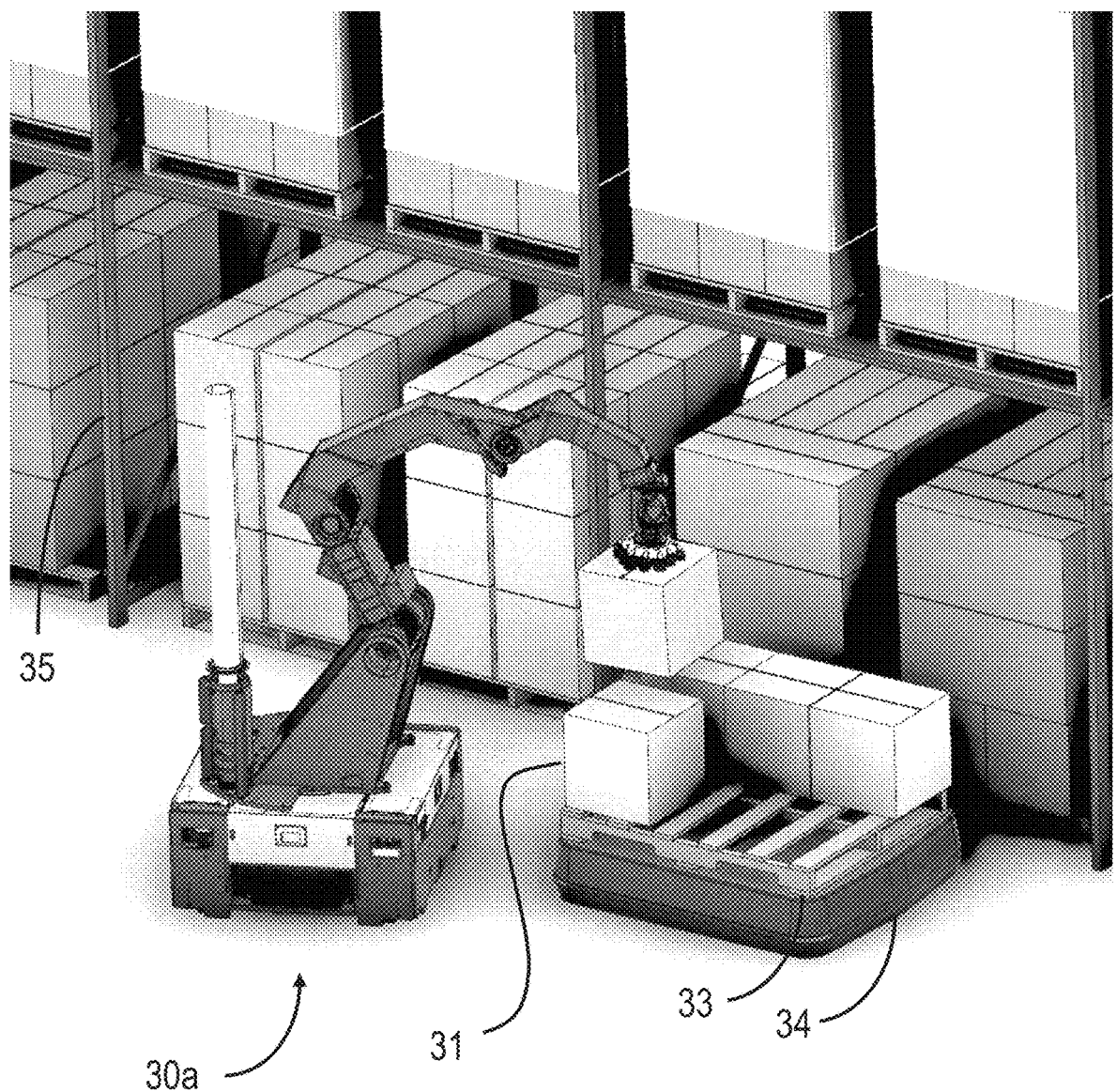
FIG. 2C depicts a robot performing an order building task in which the robot places boxes onto a pallet, according to an illustrative embodiment of the invention.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

The tasks depicted in FIGS. 2A-2C are only a few examples of applications in which an integrated mobile manipulator robot may be used, and the present disclosure is not limited to robots configured to perform only these specific tasks. For example, the robots described herein may be suited to perform tasks including, but not limited to: removing objects from a truck or container; placing objects on a conveyor belt; removing objects from a conveyor belt; organizing objects into a stack; organizing objects on a pallet; placing objects on a shelf; organizing objects on a shelf; removing objects from a shelf; picking objects from the top (e.g., performing a "top pick"); picking objects from a side (e.g., performing a "face pick"); coordinating with other mobile manipulator robots; coordinating with other warehouse robots (e.g., coordinating with AMRs); coordinating with humans; and many other tasks.

Example Robotic Arm

Figure 3:
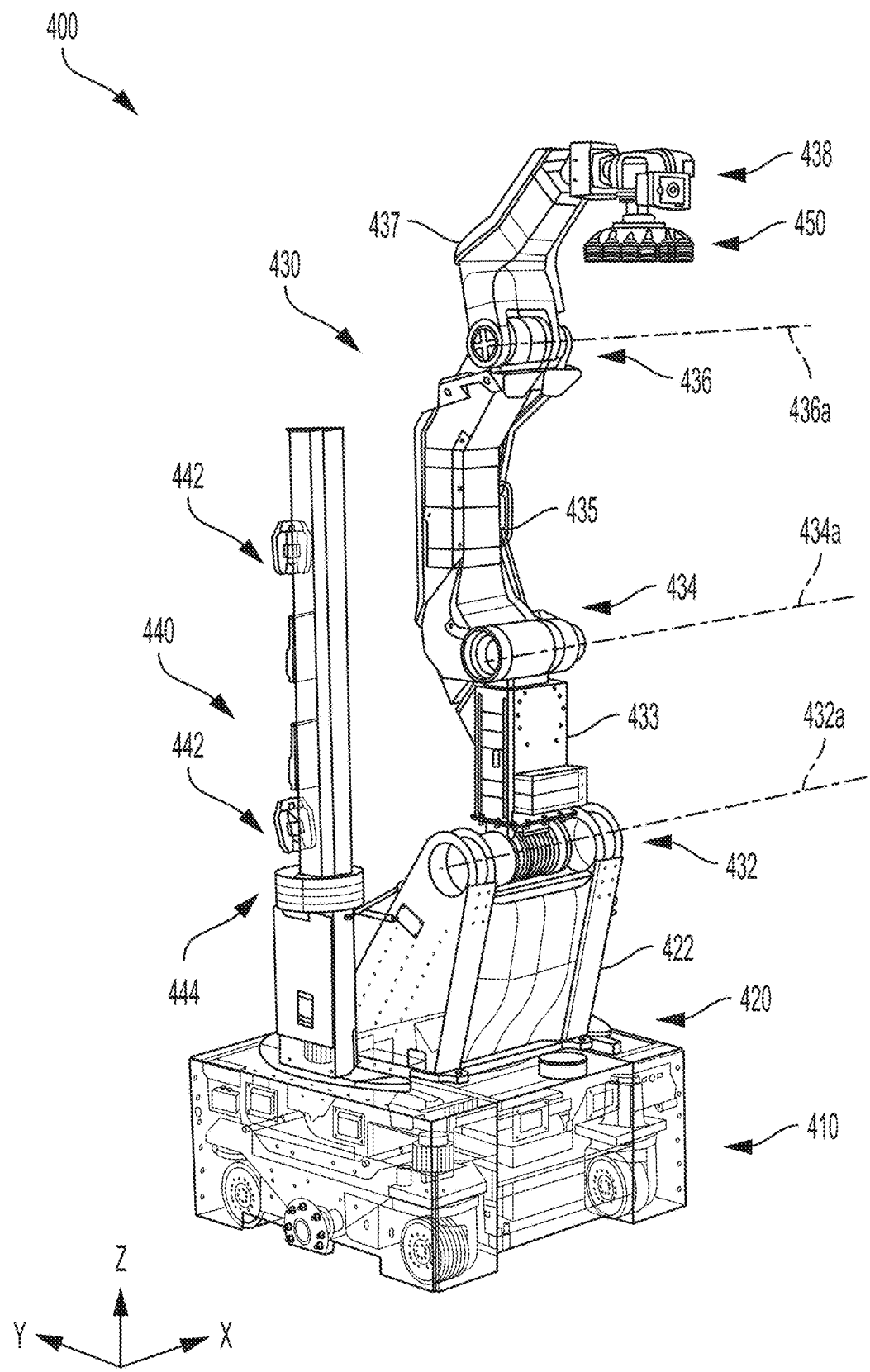
FIG. 3 is a perspective view of a robot, according to an illustrative embodiment of the invention.

FIG. 3 is a perspective view of a robot 400, according to an illustrative embodiment of the invention. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist.

Starting at the turntable 420, the robotic arm 430 includes a turntable offset 422, which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432a, 434a, and 436a, respectively.

The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432a associated with the first joint 432, the second actuator is configured to rotate the second link 435 about the second axis 434a associated with the second joint 434, and the third actuator is configured to rotate the third link 437 about the third axis 436a associated with the third joint 436. In the embodiment shown in FIG. 3, the first, second, and third axes 432a, 434a, and 436a are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. A robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

As discussed above, a mobile robot operating in a loading dock environment may be tasked with unloading boxes or other objects from trucks or containers located within a loading bay. To enable the robot to operate effectively and safely within the loading dock environment, it may be useful for the robot to identify features of the environment with which it can choose to interact (e.g., by driving over the feature, such as a ramp) or avoid (e.g., by planning movements of the robot that avoid contact with the feature). Example features within a loading dock environment include a ramp that extends from the floor up to a height at which a truck cargo container floor may be located, dock curtains that may provide weatherproofing around the area where the truck cargo container is located, and features of a truck interior (e.g., floor, ceiling, walls) of a truck located in the loading dock environment. It should be appreciated, however, that not all loading dock environments may include all features described herein. For instance, some loading dock environments may not include dock curtains.

Some conventional techniques for providing information about the features of the loading dock environment to a robot operating in the environment include having a human physically measure one or more dimensions of the features and manually providing the measured values as input to the robot. Another conventional technique includes adding fiducials to features in the environment that can be recognized by the sensors on the robot. The inventors have recognized and appreciated that existing techniques for providing information about features of a loading dock environment are prone to error and/or may require new infrastructure and/or frequent maintenance (e.g., for fiducials) to maintain their suitability for reliably providing information about the features. To this end, some embodiments of the present disclosure relate to machine learning-based techniques for determining information about features of a loading dock environment in which a mobile robot is operating to extend the capabilities of the robot to safely move and/or operate (e.g., autonomously or semi-autonomously) in the environment.

Figure 4A:
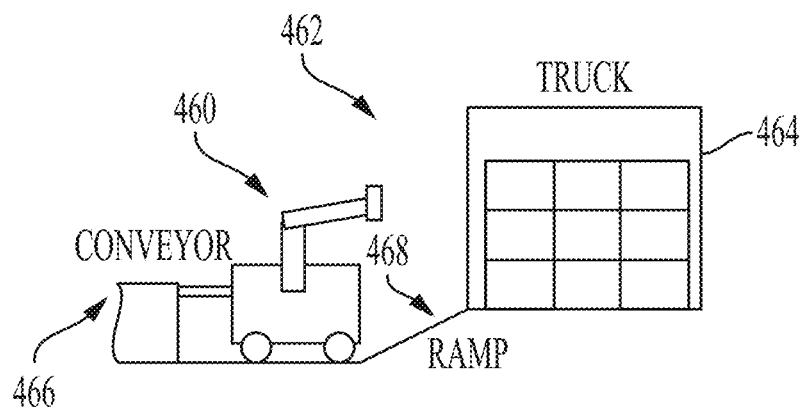
FIGS. 4A-4C schematically illustrate a process for identifying features in a loading dock environment to enable a mobile robot to enter a container, according to an illustrative embodiment of the invention.
Figure 4B:
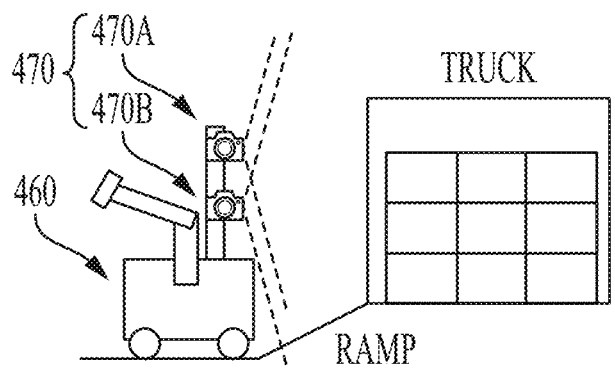
Figure 4C:
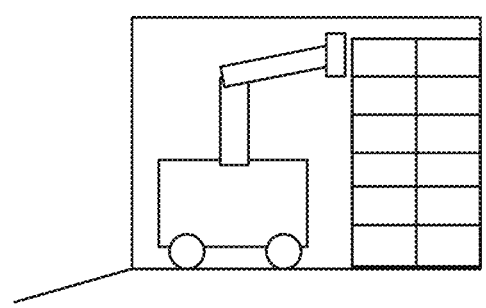

FIG. 4A schematically shows an example of a robot 460 operating in a loading dock environment 462, in accordance with some embodiments of the present disclosure. Robot 460 may be tasked with unloading boxes from truck 464 and placing the boxes on a conveyor 466 located near and/or coupled to robot 460. A ramp 468 may extend from the floor on which the robot is initially located to the floor of the cargo compartment of truck 464. If robot 460 is unable to reach boxes in truck 464 from its location shown in FIG. 4A, robot 460 may drive up ramp 468 closer to the entrance of the truck. To enable robot 460 to safely drive up ramp 468, robot 460 may capture information about one or more features of the loading dock environment, including ramp 468. For instance, as shown in FIG. 4B, robot 460 may include a camera system 470 that includes one or more camera modules (e.g., camera modules 470A, 470B). Non-limiting examples of camera modules 470A, 470B include perception modules 142 shown as being mounted on a mast of robot 100 in FIG. 1A or perception modules 442 shown as being mounted on a mast of robot 400 in FIG. 3. Camera system 470 may be configured to capture one or more images of the loading dock environment. For example, camera system 470 may be configured to capture one or more images of the loading dock environment when the robot is positioned in front of the ramp toward a truck located in a loading bay. In some embodiments, multiple images captured from different perspectives (e.g., images captured from upper and lower mast camera modules) may be used. As described in more detail below, the one or more captured images may be processed (e.g., with a trained machine learning model) to identify information about one or more features of the loading dock environment. For instance, the features identified in the image(s) may include ramp 468, the interior of truck 464, and/or dock curtains (not shown) surrounding the entrance of truck 464. The information about the features may be used, at least in part, to enable the robot 460 to safely drive up ramp 468 and into truck 464 to grasp boxes from within the truck as shown in FIG. 4C.

In situations in which there is not sufficient space in truck 464 for robot 460 to drive into the truck prior to grasping boxes (e.g., as shown in FIGS. 4A and 4B), robot 460 may be configured to begin grasping boxes from truck 464 prior to entering the truck (e.g., while robot 460 is located on ramp 468). Information about one or more features of the loading dock environment (e.g., dock curtains, truck interior) may be used, at least in part, to plan trajectories of an arm/gripper of the robot 460 to avoid contact with those features when grasping boxes. After a sufficient amount of space has been cleared within truck 464 to enable robot 460 to enter the truck, robot 460 may drive into the truck to continue grasping boxes within the truck. In some embodiments, after the robot 460 has entered the truck 424, additional sensors located on the robot (e.g., distance-based sensors such as LIDAR sensors) may be used to further refine estimates of the truck interior surfaces to improve trajectory planning and avoid collisions with those surfaces as the robot continues to operate.

In some embodiments of the present disclosure, information about one or more features of a loading dock environment may be determined based, at least in part, on one or more images of the loading dock environment captured by a camera system of a mobile robot. For instance, as described in more detail below, in some embodiments, one or more images captured by a camera system of a mobile robot may be provided as input to a machine learning model trained to identify features in a loading dock environment. For example, the machine learning model may be trained to output masks corresponding to pixels in the input image(s) associated with a ramp, dock curtains, container interiors, and/or other features of the loading dock environment.

Figure 5B:
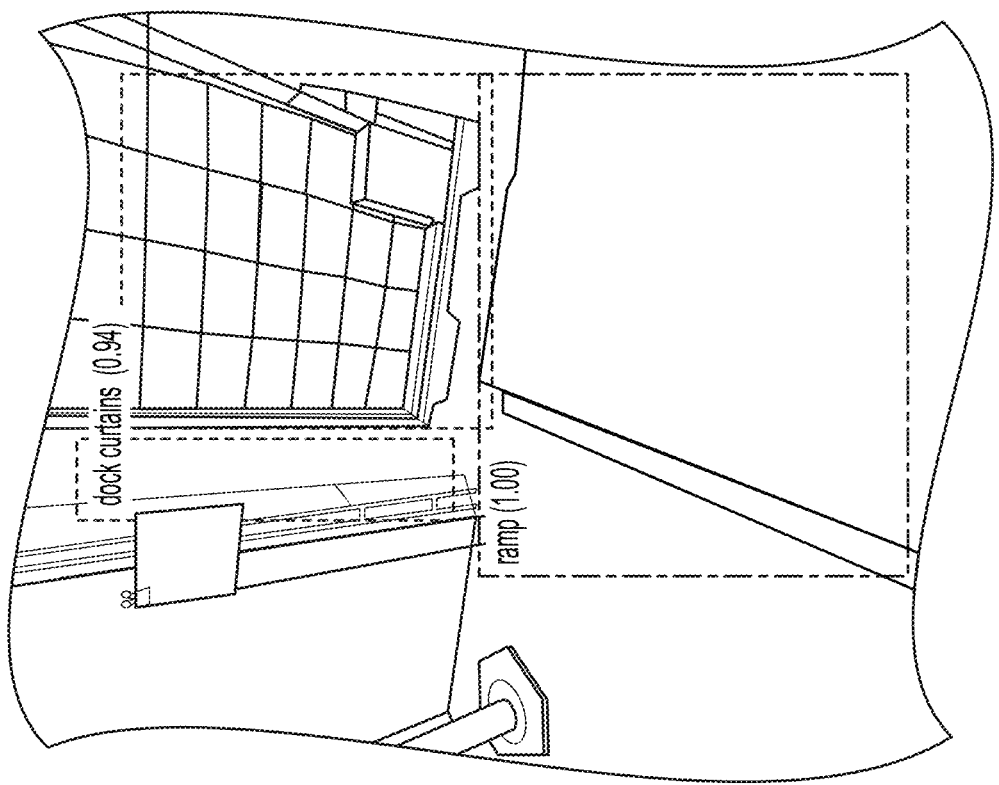
FIGS. 5A and 5B illustrate example images of loading dock environments that may be annotated and used to train a machine learning model, according to an illustrative embodiment of the invention.
Figure 5A:
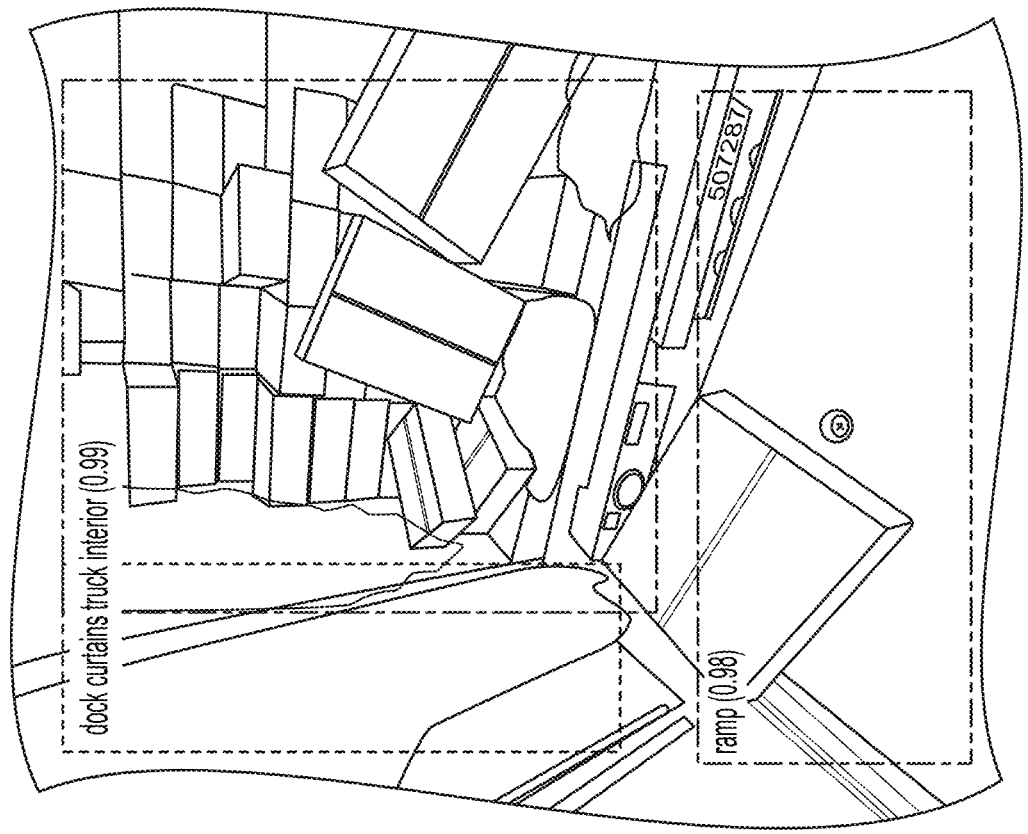

A machine-learning based approach to identifying loading dock environment features based on captured images, in accordance with some embodiments of the present disclosure, may enable a mobile robot to operate safely in a variety of loading dock environments having similar though not necessarily identical features present in the images on which the machine-learning model was trained. The flexibility of such an approach may help account for changes in the loading dock environment that may occur over time, such as ramp replacement, damaged ramp and/or dock curtains, etc. FIGS. 5A and 5B illustrate example images of a loading dock environment that have been processed by a trained machine learning model to identify a plurality of features including a ramp, a truck interior and dock curtains. As can be observed, despite the differences between the images shown in FIGS. 5A and 5B, the output of the trained machine learning model accurately identifies each of the ramp, dock curtains, and truck interior in each image, thereby demonstrating the robustness of the trained machine learning model to variations in the configuration of particular loading dock environments.

Figure 6:
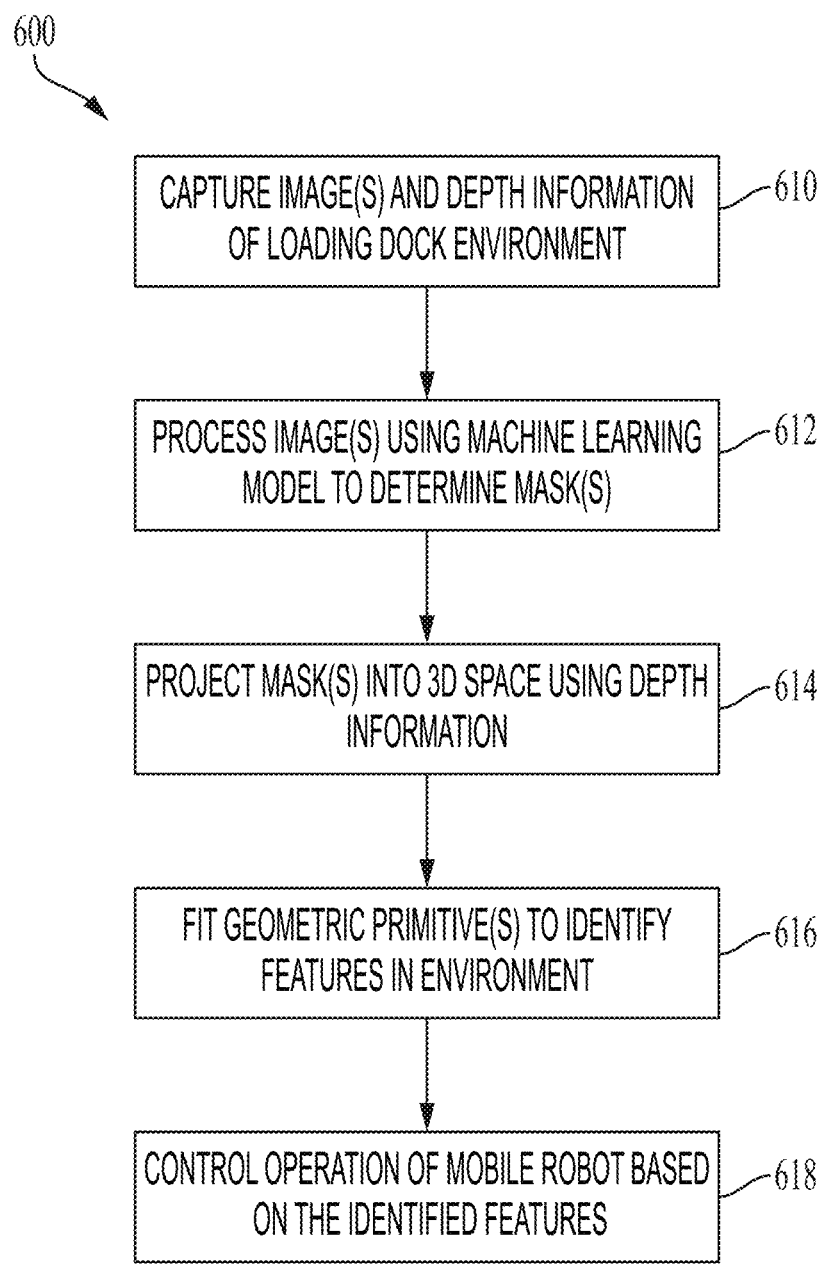
FIG. 6 is a flowchart of a process for identifying features of a loading dock environment using a trained machine learning model, according to an illustrative embodiment of the invention.

FIG. 6 illustrates a process 600 for identifying features in a loading dock environment, in accordance with some embodiments of the present disclosure. Although process 600 is described in connection with identifying features in a loading dock environment, it should be appreciated that process 600 may alternatively be used to identify features in other environments and/or scenarios in which a mobile robot may operate. For instance, process 600 may be used to identify features in a warehouse such as racks, pallets, etc. as part of an operation to place objects on a pallet.

Process 600 begins in act 610, where one or more images of a loading dock environment and depth information associated with objects in the loading dock environment is captured. For instance, a camera system located onboard a mobile robot may include one or more camera modules. Each of the camera modules may include at least one color camera (e.g., a red-green-blue (RGB) camera) configured to capture color images and at least one depth sensor (e.g., a time-of-flight sensor) configured to capture depth information.

Process 600 then proceeds to act 612, where the captured image(s) are provided as input to a machine learning model trained to recognize one or more features of the loading dock environment. In some embodiments, the machine learning model may be trained to recognize a ramp, dock curtains, and a truck interior in images provided as input to the model. In other embodiments, the machine learning model may be trained to recognize fewer or additional features of the loading dock environment. In some embodiments, the output of the machine learning model may be a plurality of masks of pixels in the image, each of which corresponds to a different feature in the loading dock environment. For instance, when the machine learning model is trained to identify a ramp, dock curtains, and a truck interior, the output of the machine learning model may include a mask for each of these features. In some embodiments, each of the features may be associated with multiple masks. For example, if there are two split ramps in the loading dock environment or if the image captures a wide view of the loading dock environment that includes multiple loading bays, the ramp feature may be associated with multiple ramp masks corresponding to each of the ramps detected in the image.

In some embodiments, one or more of the masks output from the machine learning model may be associated with a confidence value indicating a likelihood that the mask accurately represents the identified feature. If the confidence value is less than a threshold amount, it may be determined that the corresponding mask does not adequately represent its associated feature and that mask may not be used for determining an operation of the robot. The use of confidence values may also provide additional flexibility for the use of such models in different loading dock environments. For instance, some loading dock environments may not include dock curtains. In such environments, even if the machine learning model is trained to recognize dock curtains, a confidence value associated with the recognition of dock curtains in a loading dock environment that does not contain dock curtains may be sufficiently low (e.g., lower than a threshold value), thereby enabling the robot to ignore any mask associated with dock curtains output by the trained machine learning model in such an environment.

Process 600 then proceeds to act 614, where the depth information sensed in act 610 is used to project the two-dimensional (2D) mask(s) output from the machine learning model into three-dimensional (3D) space, thereby generating a 3D representation for each of the features. Projection of the 2D masks into 3D space may be accomplished using any suitable technique. In some embodiments, the depth information for the loading dock environment includes a point cloud of distance measurements for objects in the environment. When a camera module includes at least one color camera and a depth sensor, there may be a correspondence between pixels in the color image and the depth measurements. Accordingly, each of the pixels in a 2D mask output from the machine learning model may be projected into a 3D representation based, at least in part, on the depth information corresponding to the pixel in the mask.

Process 600 then proceeds to act 616, where one or more geometric primitives are fit to each of the projected 3D representations to identify features in the loading dock environment. When fitting geometric primitives to the projected 3D representations, different prior information may be used for different features. For example, rather than having a single pitch surface, ramps used in loading dock environments may have multi-pitched surfaces that include multiple planes with different pitches. Information such as the multi-pitched nature of ramps may be used in some embodiments to fit geometric primitives to the projected data. As should be appreciated, the prior information used to fit primitives to, for example, dock curtains, may be different than the prior information used to fit primitives to, for example, ramps. For example, whereas ramps tend to have rigid straight edges, dock curtains may have a less rigid structure such that the edges of the dock curtains may not be a straight line.

Process 600 then proceeds to act 618, where one or more operations of the mobile robot are controlled based, at least in part, on the identified features of the loading dock environment. For instance, as described above, identification of the location, extent, and pitch of a ramp may enable the mobile robot to traverse the ramp to safely enter or exit a truck in a loading bay. Additionally, identification of dock curtains and truck interiors may enable the mobile robot to plan arm trajectories and/or gripper positions for picking objects from the truck and placing them on a conveyor without contacting the dock curtains or truck interiors. By fitting geometric shapes that approximate the boundaries of the dock curtains with reasonable accuracy, a wider range of possible arm trajectories may be able to be used than if an overly conservative representation of the dock curtains (e.g., a representation with straight edges that enclosed the entire volume of the dock curtains) was used.

Figure 7:
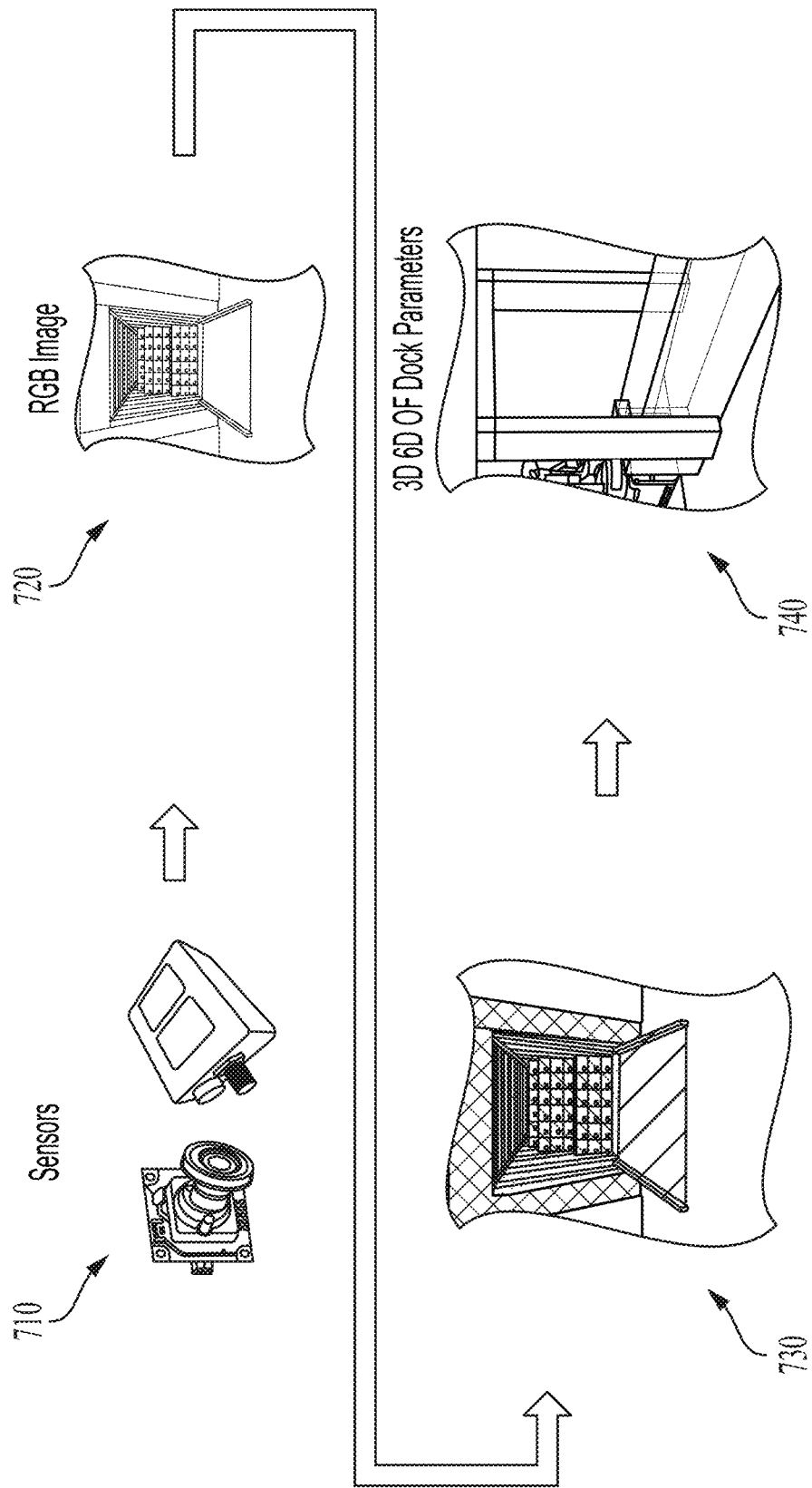
FIG. 7 schematically illustrates a process for generating 3D representations of features in a loading dock environment, according to an illustrative embodiment of the invention.

FIG. 7 schematically illustrates a process for determining features of a loading dock environment in accordance with some embodiments of the present disclosure. As shown in act 710, sensors onboard a mobile robot including, for example, at least one color camera and at least one depth sensor may be used to capture one or more images and depth information. An example of such an image captured by the sensors onboard the robot include a color image (e.g., an RGB image) of the loading dock environment as shown in act 720. The captured image(s) may be provided as input to a machine learning model trained to recognize feature(s) in the loading dock environment, resulting in one or more 2D masks output from the machine learning model, each of which represents one of the one or more features of the loading dock environment observed in the image(s). An example of 2D masks output from a trained machine learning model to identify features, in accordance with some embodiments, is shown in act 730. As described above, pixels within the 2D masks output from the trained machine learning model may be projected into 3D space using depth information. Suitable priors associated with geometric primitives may be fit to the projected points for each features, resulting in a 3D representation of each of the features in the loading dock environment. An example rendering of a 3D representation of various features in the loading dock environment is shown in in act 740 of FIG. 7.

Figures 8A, 8B, 8C:
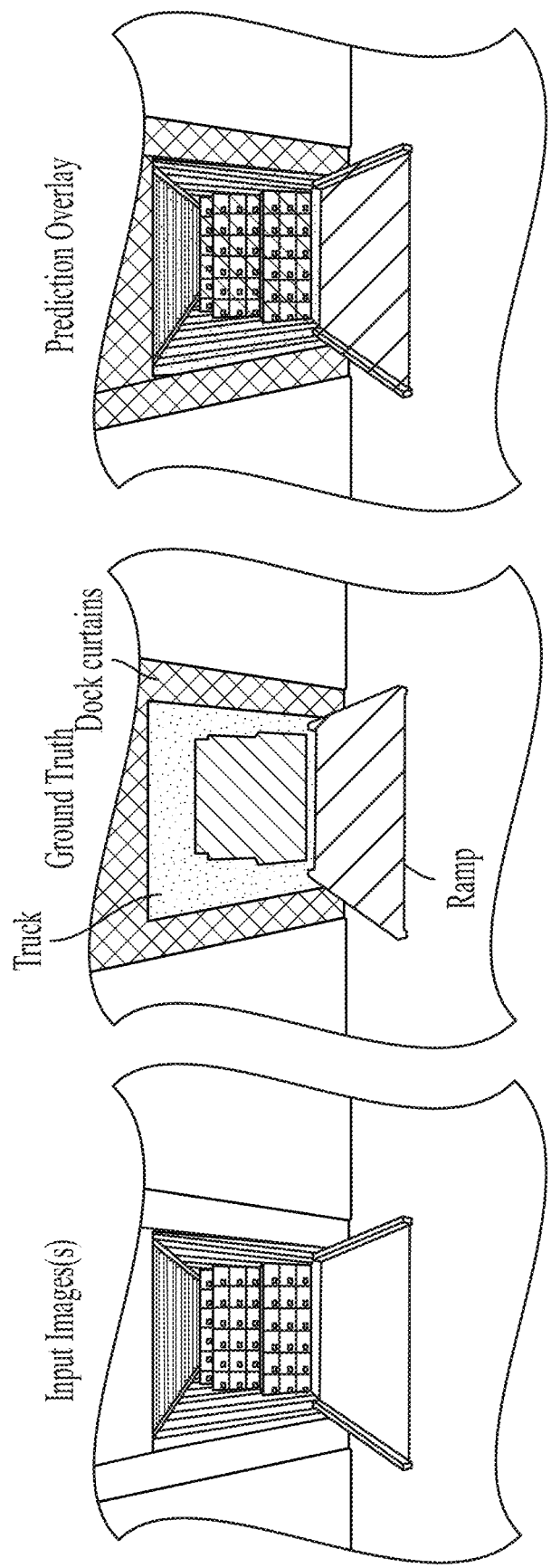
FIGS. 8A-8C schematically illustrate a process for identifying a plurality of features in a loading dock environment, according to an illustrative embodiment of the invention.

FIGS. 8A-8C schematically show processing an image using a machine learning model trained to identify features of a loading dock environment, in accordance with some embodiments of the present disclosure. FIG. 8A shows an image of a loading dock environment captured by a camera system of a mobile robot. As shown, the image includes a ramp, the interior of a truck having a stack of boxes therein, and dock curtains partially surrounding the portion of the loading bay where the truck is located. FIG. 8B illustrates a "ground truth" representation of the image in FIG. 8A in which a human has annotated the features of the loading dock environment including the ramp, the dock curtains, and the truck interior. FIG. 8C shows the output of a trained machine learning model in which a plurality of masks have been generated corresponding to the image in FIG. 8A, with the masks corresponding to the ramp, dock curtains, and the truck interior. As shown, the masks output from the trained machine learning model in FIG. 8C match well with the ground truth human annotations shown in FIG. 8B, demonstrating the accuracy of the trained machine learning model for identifying the relevant features of the loading dock environment.

Figure 9:
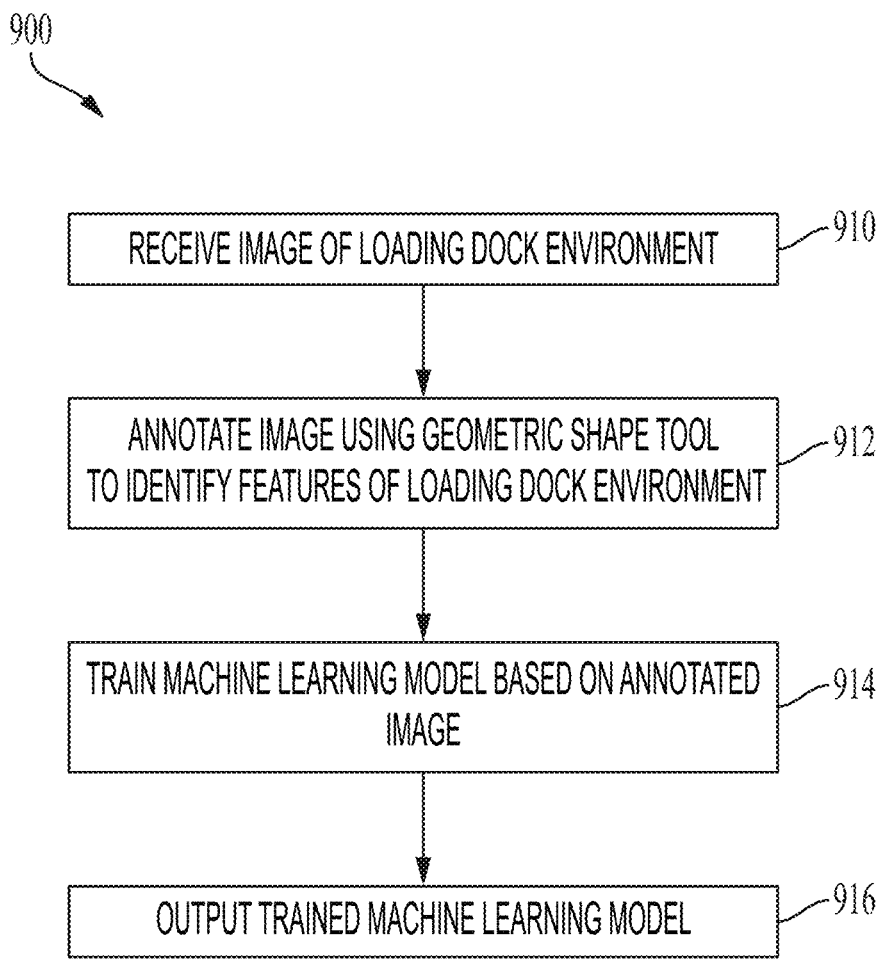
FIG. 9 is a flowchart of a process for training a machine learning model, according to an illustrative embodiment of the invention.

As described herein, some embodiments of the present disclosure relate to using a trained machine learning model to identify features of a loading dock environment represented in one or more images captured by a camera system of a mobile robot. Other embodiments relate to training such a machine learning model to identify the features of the loading dock environment. FIG. 9 illustrates a process 900 for training a machine learning model to identify features of a loading dock environment, in accordance with some embodiments of the present disclosure. In act 910, an image of a loading dock environment is received. The image may show various features of the loading dock environment including, but not limited to, a ramp, dock curtains, and/or a truck interior. Process 900 then proceeds to act 912, where the received image is annotated using a geometric shape tool to identify features of the loading dock environment present in the image. For instance, a human annotator may interact with an annotation tool to view and annotate the image using one or more polygon shapes (e.g., one or more n-sided polygons) such that the annotation of different features is displayed as an overlay on the image.

FIG. 10 illustrates an example of an annotated image in which a first annotation corresponding to a ramp feature and a second annotation corresponding to truck interior feature is displayed as an overlay on an image of a loading dock environment. As shown in FIG. 10, the stack of boxes inside of the truck is excluded from the annotation for the truck interior such that only the walls, ceiling and floor of the truck are included in the annotation. As can be appreciated from FIG. 10, certain features (e.g., the ramp feature) may have relatively linear edges such that annotation of the feature may be accomplished using relatively simple polygon shapes. Other features (e.g., the truck interior feature) may have more complicated shapes that require the use of multiple polygons to define the annotation. In such instances, neighboring annotations belonging to the same feature (e.g., truck interior) may be grouped to create a larger contiguous annotation for the feature.

FIG. 11A illustrates an example image of a loading dock environment in which dock curtains are present. FIG. 11B illustrates an example of annotating the dock curtains feature in the image of FIG. 11A in accordance with some embodiments of the present disclosure. As shown in FIG. 11B, dock curtains may not have straight line edges, but instead may have edges that are curved and/or non-uniform. By using n-sided polygons to annotate such features, an accurate representation of the boundary of the feature may be defined, which may improve the ability of the machine learning model to effectively model similar features when the trained machine learning model is used to identify features of a loading dock environment.

Returning to process 900 shown in FIG. 9, after the image has been annotated in act 912, process 900 proceeds to act 914, where the machine learning model is trained based, at least in part, on the annotated image. It should be appreciated that, in practice, the machine learning model may be trained on a plurality of annotated images (e.g., 100, 500, 1000, 5000 images or more) showing different perspectives and types of loading dock environments. Training the machine learning model with a diverse set of annotated images may improve the generalizability of the model, resulting in more accurate output when the trained machine learning model is used to identify features of a loading dock environment. Process 900 then proceeds to act 916, where the trained machine learning model is output (e.g., for use in processing further images to determine masks as described in act 612 of process 600 shown in FIG. 6).

Figure 12:
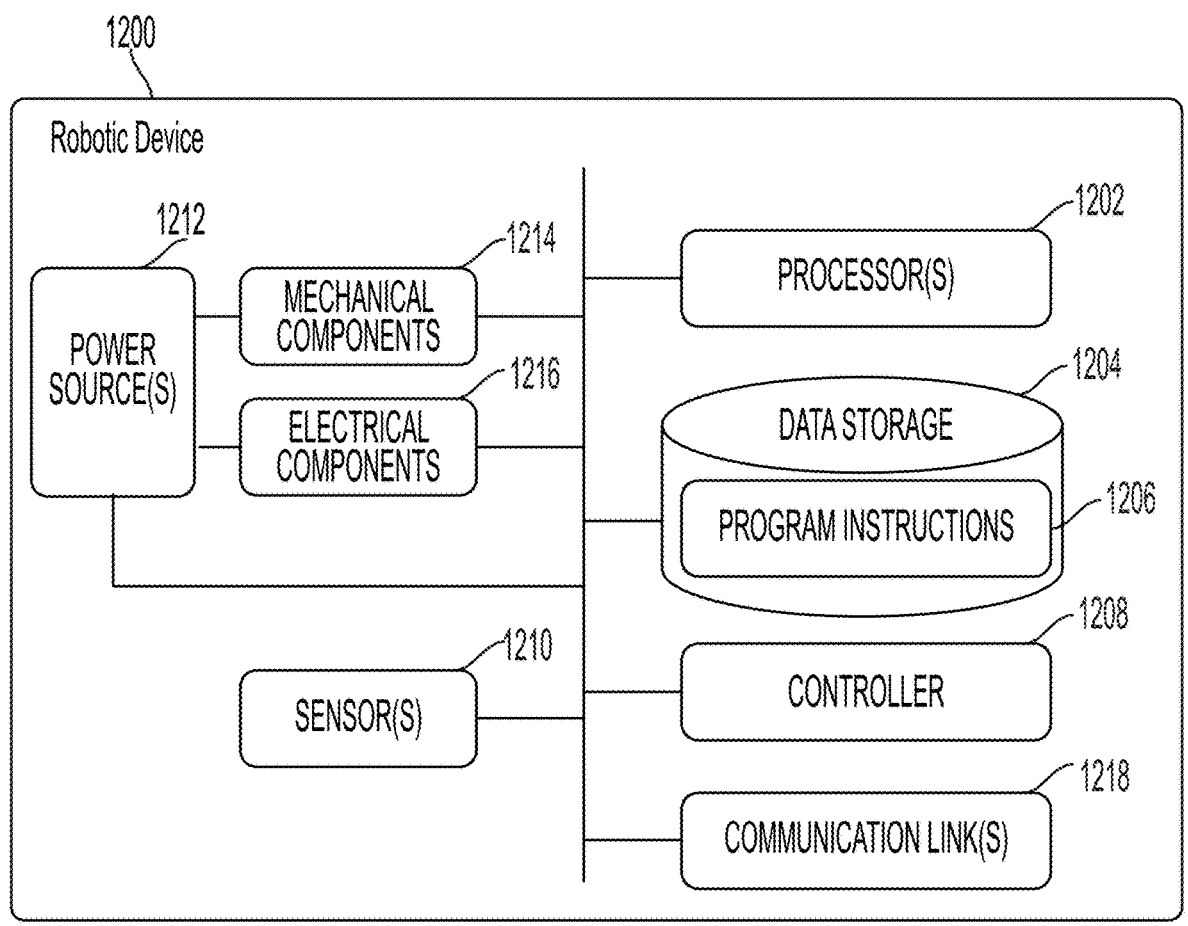
FIG. 12 illustrates an example configuration of a robotic device, according to an illustrative embodiment of the invention.

FIG. 12 illustrates an example configuration of a robotic device 1200, according to an illustrative embodiment of the invention. An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device).

In some implementations, the robotic device may include force sensors that measure or estimate the external forces (e.g., the force applied by a limb of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

FIG. 12 illustrates an example configuration of a robotic device (or "robot") 1200, according to an illustrative embodiment of the invention. The robotic device 1200 represents an example robotic device configured to perform the operations described herein. Additionally, the robotic device 1200 may be configured to operate autonomously, semi-autonomously, and/or using directions provided by user(s), and may exist in various forms, such as a humanoid robot, biped, quadruped, or other mobile robot, among other examples. Furthermore, the robotic device 1200 may also be referred to as a robotic system, mobile robot, or robot, among other designations.

As shown in FIG. 12, the robotic device 1200 includes processor(s) 1202, data storage 1204, program instructions 1206, controller 1208, sensor(s) 1210, power source(s) 1212, mechanical components 1214, and electrical components 1216. The robotic device 1200 is shown for illustration purposes and may include more or fewer components without departing from the scope of the disclosure herein. The various components of robotic device 1200 may be connected in any manner, including via electronic communication means, e.g., wired or wireless connections. Further, in some examples, components of the robotic device 1200 may be positioned on multiple distinct physical entities rather on a single physical entity. Other example illustrations of robotic device 1200 may exist as well.

Processor(s) 1202 may operate as one or more general-purpose processor or special purpose processors (e.g., digital signal processors, application specific integrated circuits, etc.). The processor(s) 1202 can be configured to execute computer-readable program instructions 1206 that are stored in the data storage 1204 and are executable to provide the operations of the robotic device 1200 described herein. For instance, the program instructions 1206 may be executable to provide operations of controller 1208, where the controller 1208 may be configured to cause activation and/or deactivation of the mechanical components 1214 and the electrical components 1216. The processor(s) 1202 may operate and enable the robotic device 1200 to perform various functions, including the functions described herein.

The data storage 1204 may exist as various types of storage media, such as a memory. For example, the data storage 1204 may include or take the form of one or more computer-readable storage media that can be read or accessed by processor(s) 1202. The one or more computer-readable storage media can include volatile and/or non-volatile storage components, such as optical, magnetic, organic or other memory or disc storage, which can be integrated in whole or in part with processor(s) 1202. In some implementations, the data storage 1204 can be implemented using a single physical device (e.g., one optical, magnetic, organic or other memory or disc storage unit), while in other implementations, the data storage 1204 can be implemented using two or more physical devices, which may communicate electronically (e.g., via wired or wireless communication). Further, in addition to the computer-readable program instructions 1206, the data storage 1204 may include additional data such as diagnostic data, among other possibilities.

The robotic device 1200 may include at least one controller 1208, which may interface with the robotic device 1200. The controller 1208 may serve as a link between portions of the robotic device 1200, such as a link between mechanical components 1214 and/or electrical components 1216. In some instances, the controller 1208 may serve as an interface between the robotic device 1200 and another computing device.

Furthermore, the controller 1208 may serve as an interface between the robotic device 1200 and a user(s). The controller 1208 may include various components for communicating with the robotic device 1200, including one or more joysticks or buttons, among other features. The controller 1208 may perform other operations for the robotic device 1200 as well. Other examples of controllers may exist as well.

Additionally, the robotic device 1200 includes one or more sensor(s) 1210 such as force sensors, proximity sensors, motion sensors, load sensors, position sensors, touch sensors, depth sensors, ultrasonic range sensors, and/or infrared sensors, among other possibilities. The sensor(s) 1210 may provide sensor data to the processor(s) 1202 to allow for appropriate interaction of the robotic device 1200 with the environment as well as monitoring of operation of the systems of the robotic device 1200. The sensor data may be used in evaluation of various factors for activation and deactivation of mechanical components 1214 and electrical components 1216 by controller 1208 and/or a computing system of the robotic device 1200.

The sensor(s) 1210 may provide information indicative of the environment of the robotic device for the controller 1208 and/or computing system to use to determine operations for the robotic device 1200. For example, the sensor(s) 1210 may capture data corresponding to the terrain of the environment or location of nearby objects, which may assist with environment recognition and navigation, etc. In an example configuration, the robotic device 1200 may include a sensor system that may include a camera, RADAR, LIDAR, time-of-flight camera, global positioning system (GPS) transceiver, and/or other sensors for capturing information of the environment of the robotic device 1200. The sensor(s) 1210 may monitor the environment in real-time and detect obstacles, elements of the terrain, weather conditions, temperature, and/or other parameters of the environment for the robotic device 1200.

Further, the robotic device 1200 may include other sensor(s) 1210 configured to receive information indicative of the state of the robotic device 1200, including sensor(s) 1210 that may monitor the state of the various components of the robotic device 1200. The sensor(s) 1210 may measure activity of systems of the robotic device 1200 and receive information based on the operation of the various features of the robotic device 1200, such the operation of extendable legs, arms, or other mechanical and/or electrical features of the robotic device 1200. The sensor data provided by the sensors may enable the computing system of the robotic device 1200 to determine errors in operation as well as monitor overall functioning of components of the robotic device 1200.

For example, the computing system may use sensor data to determine the stability of the robotic device 1200 during operations as well as measurements related to power levels, communication activities, components that require repair, among other information. As an example configuration, the robotic device 1200 may include gyroscope(s), accelerometer(s), and/or other possible sensors to provide sensor data relating to the state of operation of the robotic device. Further, sensor(s) 1210 may also monitor the current state of a function that the robotic device 1200 may currently be operating. Additionally, the sensor(s) 1210 may measure a distance between a given robotic limb of a robotic device and a center of mass of the robotic device. Other example uses for the sensor(s) 1210 may exist as well.

Additionally, the robotic device 1200 may also include one or more power source(s) 1212 configured to supply power to various components of the robotic device 1200. Among possible power systems, the robotic device 1200 may include a hydraulic system, electrical system, batteries, and/or other types of power systems. As an example illustration, the robotic device 1200 may include one or more batteries configured to provide power to components via a wired and/or wireless connection. Within examples, components of the mechanical components 1214 and electrical components 1216 may each connect to a different power source or may be powered by the same power source. Components of the robotic device 1200 may connect to multiple power sources as well.

Within example configurations, any type of power source may be used to power the robotic device 1200, such as a gasoline and/or electric engine. Further, the power source(s) 1212 may charge using various types of charging, such as wired connections to an outside power source, wireless charging, combustion, or other examples. Other configurations may also be possible. Additionally, the robotic device 1200 may include a hydraulic system configured to provide power to the mechanical components 1214 using fluid power. Components of the robotic device 1200 may operate based on hydraulic fluid being transmitted throughout the hydraulic system to various hydraulic motors and hydraulic cylinders, for example. The hydraulic system of the robotic device 1200 may transfer a large amount of power through small tubes, flexible hoses, or other links between components of the robotic device 1200. Other power sources may be included within the robotic device 1200.

Mechanical components 1214 can represent hardware of the robotic device 1200 that may enable the robotic device 1200 to operate and perform physical functions. As a few examples, the robotic device 1200 may include actuator(s), extendable leg(s), arm(s), wheel(s), one or multiple structured bodies for housing the computing system or other components, and/or other mechanical components. The mechanical components 1214 may depend on the design of the robotic device 1200 and may also be based on the functions and/or tasks the robotic device 1200 may be configured to perform. As such, depending on the operation and functions of the robotic device 1200, different mechanical components 1214 may be available for the robotic device 1200 to utilize. In some examples, the robotic device 1200 may be configured to add and/or remove mechanical components 1214, which may involve assistance from a user and/or other robotic device.

The electrical components 1216 may include various components capable of processing, transferring, providing electrical charge or electric signals, for example. Among possible examples, the electrical components 1216 may include electrical wires, circuitry, and/or wireless communication transmitters and receivers to enable operations of the robotic device 1200. The electrical components 1216 may interwork with the mechanical components 1214 to enable the robotic device 1200 to perform various operations. The electrical components 1216 may be configured to provide power from the power source(s) 1212 to the various mechanical components 1214, for example. Further, the robotic device 1200 may include electric motors. Other examples of electrical components 1216 may exist as well.

In some implementations, the robotic device 1200 may also include communication link(s) 1218 configured to send and/or receive information. The communication link(s) 1218 may transmit data indicating the state of the various components of the robotic device 1200. For example, information read in by sensor(s) 1210 may be transmitted via the communication link(s) 1218 to a separate device. Other diagnostic information indicating the integrity or health of the power source(s) 1212, mechanical components 1214, electrical components 1216, processor(s) 1202, data storage 1204, and/or controller 1208 may be transmitted via the communication link(s) 1218 to an external communication device.

In some implementations, the robotic device 1200 may receive information at the communication link(s) 1218 that is processed by the processor(s) 1202. The received information may indicate data that is accessible by the processor(s) 1202 during execution of the program instructions 1206, for example. Further, the received information may change aspects of the controller 1208 that may affect the behavior of the mechanical components 1214 or the electrical components 1216. In some cases, the received information indicates a query requesting a particular piece of information (e.g., the operational state of one or more of the components of the robotic device 1200), and the processor(s) 1202 may subsequently transmit that particular piece of information back out the communication link(s) 1218.

In some cases, the communication link(s) 1218 include a wired connection. The robotic device 1200 may include one or more ports to interface the communication link(s) 1218 to an external device. The communication link(s) 1218 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

A number of implementations have been described. Nevertheless, it will be understood that various modifications may be made without departing from the spirit and scope of the disclosure.

The invention claimed is:

1. A method of operating a mobile robot in a loading dock environment, the method comprising:
   capturing, by a camera system of the mobile robot, at least one image of the loading dock environment;
   providing the at least one image as input to a machine learning model trained to identify one or more features of the loading dock environment, wherein the one or more features include a ramp and/or dock curtains;
   processing, by at least one hardware processor of the mobile robot, the at least one image using the machine learning model to identify the ramp and/or dock curtains in the loading dock environment; and
   controlling an operation of the mobile robot based, at least in part, on a location of the ramp and/or dock curtains identified in the loading dock environment, wherein controlling the operation of the mobile robot includes controlling the mobile robot to drive in a particular direction and/or controlling the mobile robot to move an arm of the mobile robot through an arm trajectory.

2. The method of claim 1, further comprising:
   capturing, by the camera system, depth information associated with objects in the loading dock environment,
   wherein controlling an operation of the mobile robot is further based, at least in part, on the depth information.

3. The method of claim 2, wherein processing the at least one image using the machine learning model to identify the ramp and/or dock curtains in the loading dock environment determining at least one mask identifying the one or more features, the method further comprising:
   generating a three-dimensional (3D) representation of each of the one or more features of the loading dock environment based on the at least one mask and the depth information,
   wherein controlling the operation of the mobile robot is based, at least in part, on the 3D representation of at least one of the one or more features of the loading dock environment.

4. The method of claim 3, wherein generating the 3D representation of each of the one or more features of the loading dock environment comprises:
   projecting pixels in each of the at least one mask into the 3D representation using the depth information.

5. The method of claim 4, wherein generating the 3D representation of each of the one or more features of the loading dock environment further comprises:
   fitting one or more geometric primitives to the projected pixels to generate the 3D representation of each of the one or more features.

6. The method of claim 1, wherein processing the at least one image using a machine learning model comprises generating at least one mask identifying the one or more features in the at least one image.

7. The method of claim 6, wherein generating at least one mask identifying the one or more features in the at least one image comprises generating a first mask identifying a first feature of the loading dock environment and generating a second mask identifying a second feature of the loading dock environment.

8. The method of claim 1, wherein
   controlling the mobile robot to drive in a particular direction comprises controlling the mobile robot to drive on the ramp.

9. The method of claim 1, further comprising:
   planning the arm trajectory for the mobile robot, wherein the arm trajectory avoids contact of the mobile robot and/or an object grasped by the mobile robot with the one or more features of the loading dock environment.

10. The method of claim 9, wherein
    planning the arm trajectory for the mobile robot comprises planning the arm trajectory to avoid contact of the mobile robot and/or an object grasped by the mobile robot with the dock curtains.

11. The method of claim 9, wherein
    the one or more features of the loading dock environment include a truck interior, and
    planning the arm trajectory for the mobile robot comprises planning the arm trajectory to avoid contact of the mobile robot and/or an object grasped by the mobile robot with the truck interior.

12. The method of claim 1, wherein controlling an operation of the mobile robot based, at least in part, on an output of the machine learning model comprises controlling the mobile robot to grasp an object inside of a truck in the loading dock environment while a base of the mobile robot is located outside of the truck.

13. The method of claim 1, wherein the at least one image comprises a color image.

14. The method of claim 1, wherein the one or more features of the loading dock environment includes the ramp and the dock curtains.

15. The method of claim 14, wherein the one or more features of the loading dock environment further include a truck interior.

16. A mobile robot, comprising:
    a camera system;
    an arm; and
    at least one hardware processor programmed to:
       control the camera system to capture at least one image of a loading dock environment;
       provide the at least one image as input to a machine learning model trained to identify one or more features of the loading dock environment, wherein the one or more features include a ramp and/or dock curtains; and
       processing the at least one image using the machine learning model to identify the ramp and/or dock curtains in the loading dock environment; and
       control an operation of the mobile robot based, at least in part, on a location of the ramp and/or dock curtains identified in the loading dock environment, wherein controlling the operation of the mobile robot includes one or more of controlling the mobile robot to drive in a particular direction and controlling the mobile robot to move the arm of the mobile robot through an arm trajectory.

17. A method of operating a mobile robot in a loading dock environment including a truck, the method comprising:
   positioning a base of the mobile robot outside of the truck;
   capturing at least one image of the loading dock environment;
   processing, by at least one hardware processor of the mobile robot, the at least one image of the loading dock environment with a trained machine learning model to determine information about dock curtains and/or an interior of the truck;
   planning an arm trajectory of the mobile robot based, at least in part, on the information about the dock curtains and/or the interior of the truck to avoid contact with the dock curtains and/or the interior of the truck; and
   executing the arm trajectory to grasp an object inside the truck while the base of the mobile robot remains outside of the truck.

* * * * *